April 19, 1949.  O. R. SCHOENROCK  2,467,501
CONVEYER AND AUGER FEED FOR COMBINES
Filed Feb. 15, 1946                                    2 Sheets-Sheet 1
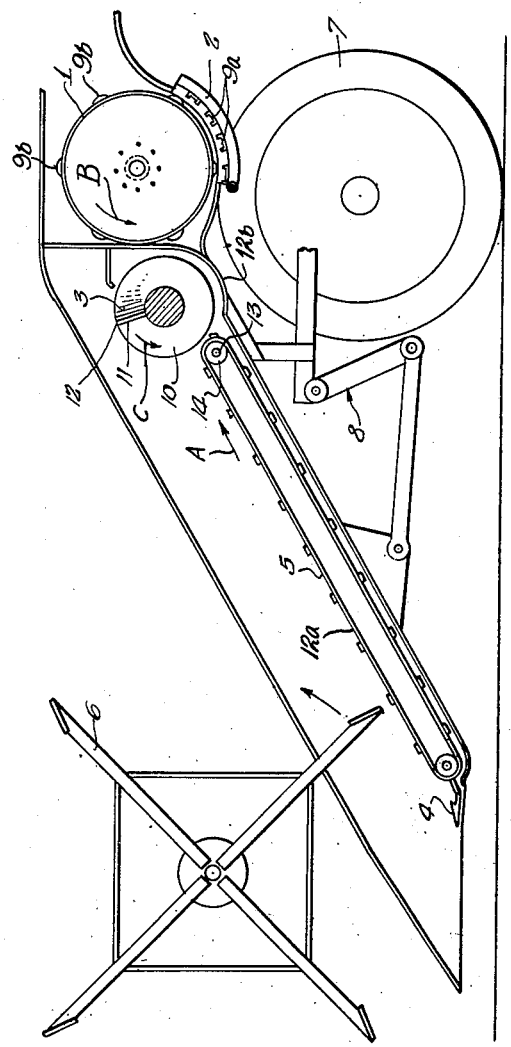
INVENTOR.
Otto R. Schoenrock
BY Thiess, Olian &
Mecklenburger
Attys.

April 19, 1949.  O. R. SCHOENROCK  2,467,501
CONVEYER AND AUGER FEED FOR COMBINES
Filed Feb. 15, 1946  2 Sheets-Sheet 2
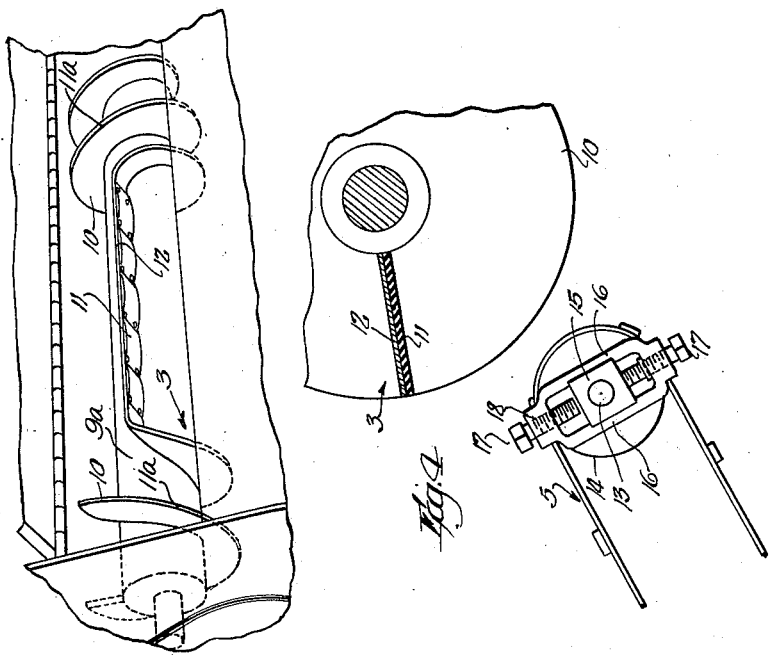
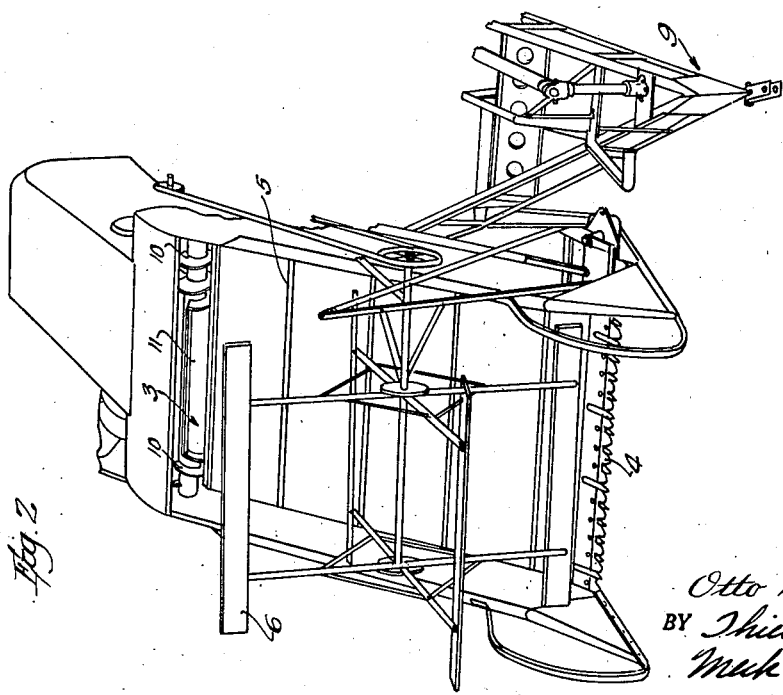
INVENTOR.
Otto R. Schoenrock
BY Thiess, Olson &
Mecklenburger
Attys.

Patented Apr. 19, 1949

2,467,501

UNITED STATES PATENT OFFICE 2,467,501

CONVEYER AND AUGER FEED FOR COMBINES

Otto R. Schoenrock, Oak Park, Ill., assignor to J. I. Case Company, Racine, Wis., a corporation of Wisconsin Application February 15, 1946, Serial No. 647,820

2 Claims. (Cl. 56—123)

My invention relates to conveyor and auger feed for combines.

One of the objects of my invention is to provide an improved endless conveyor and auger feed for combines in which the endless conveyor delivers the cut material directly to the auger, the upper run of the endless conveyor extending from the sickle to a delivery point adjacent the periphery of the feed auger and lying in a plane which extends adjacent or below the axis of the auger, the relative positions of the conveyor and auger being such that the auger will readily sweep the cut material from the conveyor and advance it to the threshing cylinder.

Further objects and advantages of the invention will be apparent from the description and claims.

In the drawings,

Figure 1 is a side elevational view of the front end of a combine, parts being broken away;

Fig. 2 is a perspective view of the front end of the combine;

Fig. 3 is a perspective view of the feed auger; and

Fig. 4 is an enlarged detail sectional view showing portions of the conveyor and feed auger.

Referring to the drawings in detail, the construction shown comprises a rotatable threshing cylinder 1, a concave 2 cooperating therewith, a rotatable feed auger or beater 3 adjacent and in front of the cylinder and extending laterally therebeyond on both sides for receiving the cut material and conveying it laterally inwardly from both sides and delivering it to the cylinder, a sickle 4 located downwardly and forwardly with respect to the feed auger, an inclined endless conveyor 5, extending upwardly and rearwardly between the sickle and feed auger, the upper run of said conveyor receiving the cut material and traveling upwardly and rearwardly in the direction of the arrow A to a point adjacent the periphery of the feed auger and lying in a plane which extends adjacent or below the axis of the feed auger, a reel 6 for pressing the standing material to be cut against the sickle and sweeping the cut material rearwardly onto the conveyor, ground engaging wheels 7 for supporting the front end of the combine, adjusting means 8 for varying the height of the sickle, and tractor hitch means 9 for connecting the combine to a tractor. The cylinder 1, concave 2, feed auger 3, sickle 4, conveyor 5, reel 6, supporting wheels 7, and sickle adjusting means 8 may be of any usual construction. The cylinder shown is of the steel rub bar type, the rub bars 9b co-operating with the concave bars 9a. The cylinder and auger are driven in the direction indicated by the arrows B and C in Fig. 1.

The auger and feeding beater 3, shown somewhat in detail in Fig. 3, comprises a central core 9a, the two helical screw conveyor portions 10, one at each end of the auger, and the central beater portion 11 which may be faced with rubber or the like if desired and which receives the cut material from the two ends of the beater and feeds it to the cylinder 1. The helical edges 11a of the end portions 10 of the auger and the straight edge 12 of the central portion of the auger sweep the material from the upper end of the conveyor and deliver it to the cylinder. I have found that by locating the conveyor and auger so that the upper run 12a of the conveyor lies in a plane which extends adjacent or below the axis of the auger the auger receives the material from the conveyor and sweeps it therefrom without any clogging up of the cut material at the point of delivery to the auger. The auger beater 3 is formed with a trough-like grain guide 12b extending underneath the auger adjacent its periphery and coaxial therewith and extending from a position adjacent the upper end of the endless conveyor to a position adjacent the periphery of the threshing cylinder whereby the grain will be propelled and guided by the feeding beater and guide from the endless conveyor to the threshing cylinder.

In order to provide some adjustment for different types of cut material, I may mount the shaft 13 on which the upper conveyor wheels or rotor 14 are mounted in such a way that the shaft may be adjusted up or down to vary the relation of the axis of these conveyor wheels to the axis of the beater 3. For this purpose, the bearings 15 in which the conveyor shaft is mounted may be slidable in upwardly extending guides 16, and the position of the bearings in these guides may be adjusted up and down by means of screws 17 threaded in supporting bracket 18 with their ends engageable with the bearings 15.

In a combine in common use the sickle may cut a 54-inch swath and the feed auger or beater may feed the edges of the cut material inwardly to deliver it to a 28-inch length cylinder.

Any suitable means may be provided for driving the cylinder 1, auger 3, conveyor 5, and reel 6 in the direction of the arrows indicated in Fig. 1.

Further modifications will be apparent to those skilled in the art and it is desired, therefore, that the invention be limited only by the scope of the appended claims.

Having thus described my invention, what I claim and desire to secure by Letters Patent is:

1. In a combine, a carriage, a sickle for cutting grain mounted on said carriage, an inclined endless conveyor mounted on said carriage, the upper run of which travels upwardly and rearwardly from said sickle, a rotor about which the upper end of the endless conveyor travels, a reel mounted on said carriage for pressing the standing grain against the sickle and sweeping the cut grain rearwardly into the conveyor, a feed auger mounted on said carriage having its periphery adjacent the upper rearward end of the conveyor and substantially coextensive laterally therewith for brushing the cut material downwardly and rearwardly from said conveyor, and a rotatable threshing cylinder mounted on said carriage having its periphery adjacent the rear edge of said auger to which the feed auger delivers the cut material, said feed auger extending laterally beyond said cylinder, the pitch of the laterally-extending portions of said screw conveyor being such as to feed the cut material from said laterally-extending portions inwardly to be delivered to the cylinder, the upper run of the conveyor lying in a plane which extends adjacent or below the axis of said auger, the plane through the axis of said rotor and the axis of said auger intersecting the lower run of said endless conveyor whereby the auger sweeps the grain downwardly and rearwardly from the upper end of the conveyor, said auger being provided with a trough-like grain guide underneath it adjacent its periphery and coaxial therewith and extending from a position adjacent the upper end of the endless conveyor to a position adjacent the periphery of the threshing cylinder whereby the grain will be propelled and guided by the feeding beater and guide from the endless conveyor to the threshing cylinder.

2. In a combine, a carriage, a sickle for cutting grain mounted on said carriage, an inclined endless conveyor mounted on said carriage, the upper run of which travels upwardly and rearwardly from said sickle, a rotor about which the upper end of the endless conveyor travels, a reel mounted on said carriage for pressing the standing grain against the sickle and sweeping the cut grain rearwardly into the conveyor, a feed auger mounted on said carriage having its periphery adjacent the upper rearward end of the conveyor and substantially coextensive laterally therewith for brushing the cut material downwardly and rearwardly from said conveyor, and a rotatable threshing cylinder mounted on said carriage having its periphery adjacent the rear edge of said auger to which the feed auger delivers the cut material, said feed auger extending laterally beyond said cylinder, the pitch of the laterally-extending portions of said screw conveyor being such as to feed the cut material from said laterally-extending portions inwardly to be delivered to the cylinder, the upper run of the conveyor lying in a plane which extends adjacent or below the axis of said auger, said feed auger having a beater blade extending longitudinally of its axis and radially with respect thereto into close proximity to the upper end of the conveyor for sweeping the cut material from the conveyor to the cylinder, the plane through the axis of said rotor and the axis of said auger intersecting the lower run of said endless conveyor whereby the beater blade sweeps the grain downwardly and rearwardly from the upper end of the conveyor, said auger being provided with a trough-like grain guide underneath it and coaxial therewith and extending from a position adjacent the upper end of the endless conveyor to a position adjacent the periphery of the threshing cylinder whereby the grain will be propelled and guided by the feeding beater and guided from the endless conveyor to the threshing cylinder.

OTTO R. SCHOENROCK.

REFERENCES CITED

The following references are of record in the file of this patent:

UNITED STATES PATENTS

| Number | Name | Date |
|---|---|---|
| 2,161,634 | Pierson | June 6, 1939 |
| 2,354,346 | MacGregor | July 25, 1944 |